United States Patent
Masuda et al.

(10) Patent No.: US 7,795,881 B2
(45) Date of Patent: Sep. 14, 2010

(54) CAPACITIVE PHYSICAL QUANTITY DETECTION DEVICE

(75) Inventors: Masashi Masuda, Nukata-gun (JP); Junji Hayakawa, Okazaki (JP)

(73) Assignee: DENSO CORPORATION, Kariya (JP)

( * ) Notice: Subject to any disclaimer, the term of this patent is extended or adjusted under 35 U.S.C. 154(b) by 267 days.

(21) Appl. No.: 12/007,912

(22) Filed: Jan. 17, 2008

(65) Prior Publication Data
US 2008/0191714 A1    Aug. 14, 2008

(30) Foreign Application Priority Data
Feb. 8, 2007   (JP) ............................. 2007-029568

(51) Int. Cl.
G01R 27/26   (2006.01)
(52) U.S. Cl. .................... 324/661; 73/514.32; 340/690
(58) Field of Classification Search .................. 324/661
See application file for complete search history.

(56) References Cited

U.S. PATENT DOCUMENTS

| | | | |
|---|---|---|---|
| 6,257,061 B1 | 7/2001 | Nonoyama et al. | |
| 6,483,322 B2 * | 11/2002 | Aoyama et al. | 324/661 |
| 6,761,070 B2 * | 7/2004 | Zarabadi et al. | 73/514.32 |
| 7,039,513 B2 | 5/2006 | Hermann et al. | |
| 2003/0099307 A1 * | 5/2003 | Wu | 375/317 |
| 2006/0186901 A1 * | 8/2006 | Itakura et al. | 324/689 |
| 2006/0250267 A1 * | 11/2006 | Umemura et al. | 340/690 |
| 2007/0126432 A1 * | 6/2007 | Goto | 324/658 |
| 2007/0159183 A1 * | 7/2007 | Umemura et al. | 324/661 |
| 2008/0196499 A1 * | 8/2008 | Li et al. | 73/510 |

FOREIGN PATENT DOCUMENTS

| | | |
|---|---|---|
| JP | A-8-32090 | 2/1996 |
| JP | A-9-113534 | 5/1997 |
| JP | A-2003-201907 | 7/2003 |
| JP | A-2005-83983 | 3/2005 |
| JP | A-2006-292469 | 10/2006 |

OTHER PUBLICATIONS

Office Action dated Jan. 20, 2009 in corresponding Japanese patent application No. 2007-029568 (and English translation).

* cited by examiner

*Primary Examiner*—Timothy J Dole
*Assistant Examiner*—Benjamin M Baldridge
(74) *Attorney, Agent, or Firm*—Posz Law Group, PLC

(57) ABSTRACT

A capacitive physical quantity detection device comprising a plurality of capacitive physical quantity sensors, wherein each sensor includes: a detection unit having a movable electrode and a fixed electrode; a C-V conversion circuit having a differential amplifier circuit, wherein a first input terminal of the differential amplifier circuit is coupled with the movable electrode, a second input terminal of the differential amplifier circuit inputs a reference voltage and a self-diagnosis voltage therein during a normal operation and a self-diagnosis operation, respectively, and the C-V conversion circuit outputs an output voltage; and a signal processing circuit that performs a signal processing of the output voltage, wherein the reference voltage in each sensor is substantially the same, the plurality of sensors performs the self-diagnosis operation simultaneously, and the self-diagnosis voltage in one of the sensors is a first self-diagnosis voltage that is different in magnitude from the self-diagnosis voltage in another one of the sensors.

10 Claims, 3 Drawing Sheets

CAPACITIVE PHYSICAL QUANTITY DETECTION DEVICE

CROSS REFERENCE TO RELATED APPLICATION

The present application is based on Japanese Patent Application No. 2007-29568 filed on Feb. 8, 2007, the disclosure of which is incorporated herein by reference.

FIELD OF THE INVENTION

The present invention relates to a capacitive physical quantity detection device for detecting physical quantity such as acceleration, angular velocity, pressure and the like.

BACKGROUND OF THE INVENTION

A capacitive physical quantity sensor detects physical quantity such as acceleration, angular velocity, pressure and the like. Japanese Patent Application Publication No. 2002-40047, corresponding to U.S. Pat. No. 6,483,322, discloses a capacitive physical quantity sensor that has a self-diagnostic function for diagnosing output accuracy of the sensor.

A sensor like the above-described sensor includes a C-V conversion circuit having a differential amplifier circuit. One of a reference electric potential and a self-diagnosis electric potential is input into an input terminal of the differential amplifier circuit via a switch. The reference electric potential is used for detecting a capacitance change. The self-diagnosis electric potential is used for a self-diagnosis operation. The reference electric potential is different from the self-diagnosis electric potential. The above-described input terminal of the differential amplifier circuit is a non-inverting input terminal of the differential amplifier circuit for instance. When the self-diagnosis operation is performed, the switch is driven, and the self-diagnosis electric potential is applied. When a normal operation other than the self-diagnosis operation is performed, the reference electric potential is input.

When a plurality of sensors has an almost identical configuration, and when each sensor has a self-diagnosis function like the above-described self-diagnosis function, an output electric potential from each sensor may be approximately the same during a period of the self-diagnosis operation. In the above-described case, even if one of the sensors does short, the output electric potential does not change, and thus, it is difficult to determine whether the output is an appropriate self-diagnosis output or an abnormal output resulting from the abnormal short.

SUMMARY OF THE INVENTION

In view of the above-described problem, it is an object of the present invention to provide a capacitive physical quantity detection device.

According to an aspect of the present invention, a capacitive physical quantity detection device for detecting physical quantity includes a plurality of capacitive physical quantity sensors. Each capacitive physical quantity sensor includes: a detection unit having a movable electrode movable in accordance with the physical quantity and a fixed electrode facing the movable electrode; a C-V conversion circuit having a differential amplifier circuit, wherein a first input terminal of the differential amplifier circuit is coupled with the movable electrode, a second input terminal of the differential amplifier circuit inputs a reference voltage therein during a period of a normal operation and inputs a self-diagnosis voltage therein during a period of a self-diagnosis operation, the reference voltage is used for detecting a capacitance change between the movable electrode and the fixed electrode, the self-diagnosis voltage is used for performing the self-diagnosis operation, the self-diagnosis voltage is different from the reference voltage, and the C-V conversion circuit outputs an output voltage corresponding to the capacitance change between the movable electrode and the fixed electrode; and a signal processing circuit that performs a signal processing of the output voltage from the C-V conversion circuit so as to produce a signal corresponding to the physical quantity. The reference voltage in each capacitive physical quantity sensor is almost the same. The plurality of capacitive physical quantity sensors performs the self-diagnosis operation simultaneously. The self-diagnosis voltage in one of the plurality of capacitive physical quantity sensors is a first self-diagnosis voltage. The self-diagnosis voltage in another one of the plurality of capacitive physical quantity sensors is a second self-diagnosis voltage. The first self-diagnosis voltage is different from the second self-diagnosis voltage.

According to the above capacitive physical quantity detection device, the self-diagnosis voltage in each capacitive physical quantity sensor is applied to the second terminal of the differential amplifier circuit. The capacitive physical quantity detection device can detect an abnormal failure even though the reference voltage in each capacitive physical quantity sensor is almost the same, and even though the plurality of capacitive physical quantity sensors performs the self-diagnosis operation simultaneously.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
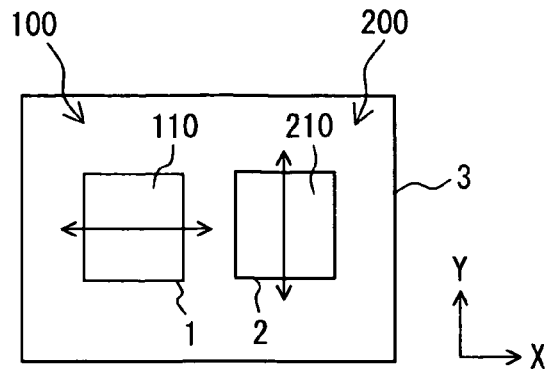
FIG. 1 is a plan view of a capacitive physical quantity detection device according to a first embodiment of the present invention.
Figure 2:
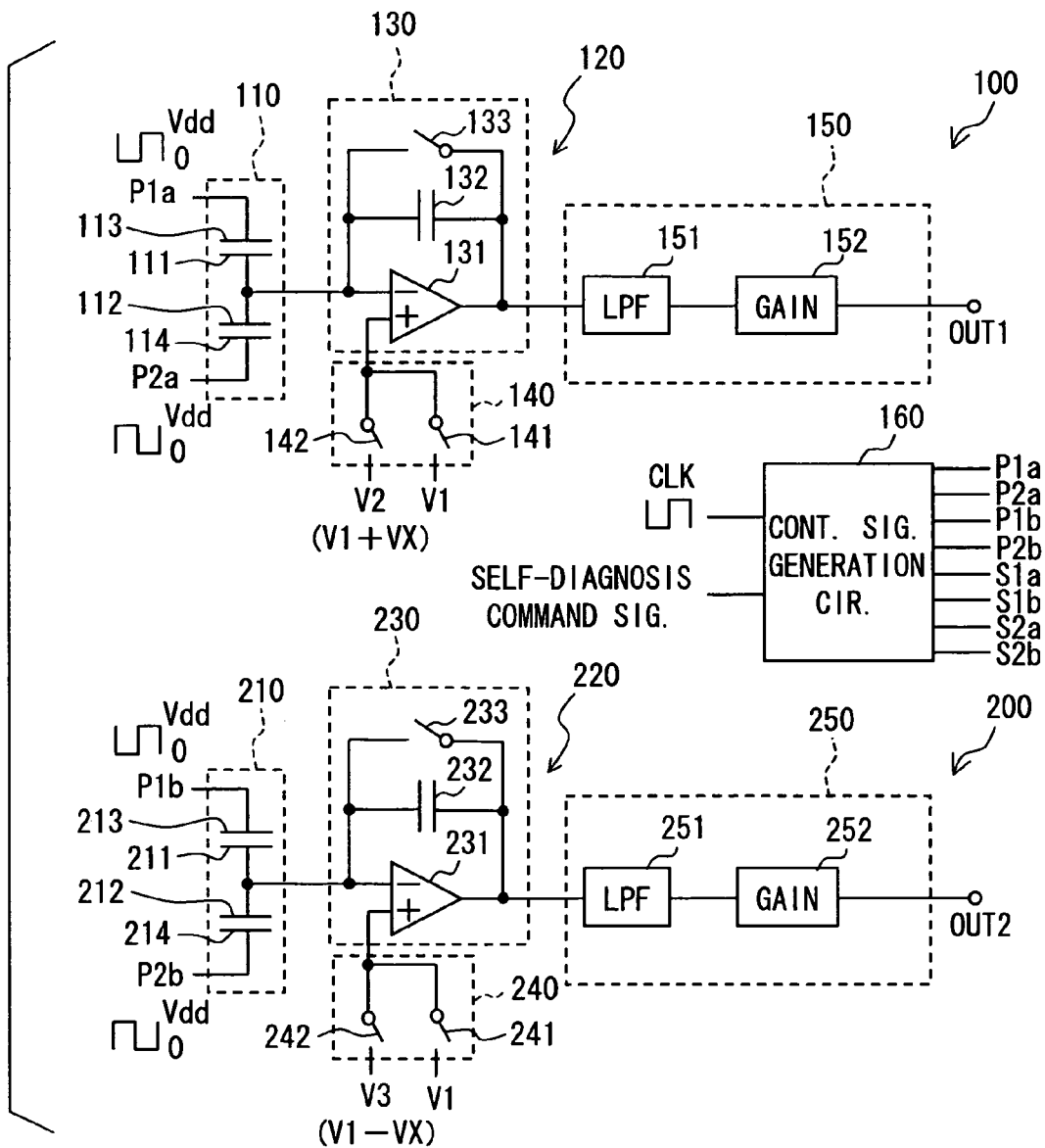
FIG. 2 is a block diagram of a circuit configuration of the capacitive physical quantity detection device.

A capacitive physical quantity detection device includes a plurality of capacitive physical quantity sensors each of which has a self-diagnosis function. In the present embodiment, as shown in FIGS. 1 and 2, the capacitive physical quantity detection device includes: an acceleration sensor 100 for detecting an X axis component of acceleration; and an acceleration sensor 200 for detecting a Y axis component of the acceleration. The capacitive physical quantity detection device is configured so that the X axis is orthogonal to the Y axis. As shown in FIG. 1, the acceleration sensors 100, 200 are mounted to a vehicle such that the X axis is parallel to line between a vehicle front and a vehicle rear, and the Y axis is parallel to line between a vehicle right side and a vehicle left side for instance. The capacitive physical quantity detection device may be included in or applied to a drive assist system for a vehicle, which is an attitude control system such as a vehicle stability control (VSC) system for instance.

The two acceleration sensors 100, 200 have a substantially identical configuration. As shown in FIG. 2, the acceleration sensor 100 includes a detection unit 110 and a detection circuit 120. The detection unit 110 includes movable electrodes 111, 112 and fixed electrodes 113, 114. The detection circuit 120 can obtain the acceleration based on capacitance change or differential capacitance change between the movable electrodes 111, 112 and the fixed electrodes 113, 114. The acceleration sensor 200 includes a detection unit 210 and a detection circuit 220. The detection unit 210 includes movable electrodes 211, 212 and fixed electrodes 213, 214. The detection circuit 220 can obtain the acceleration based on capacitance change or differential capacitance change between the movable electrodes 211, 212 and the fixed electrodes 213, 214. A configuration and a function of an acceleration sensor like the sensors 100, 200 can be found in or referred to, for example, Japanese Patent Application Publication 2002-40047 and Japanese Patent Application Publication 2006-292469, which are disclosed by the inventor of the present application. In the present embodiment, as shown in FIG. 1, the detection units 110, 210 of acceleration sensors 100, 200 are configured in a chip 1 and a chip 2, respectively. The chip 1 is provided separately from the chip 2. The detection circuits 120, 220 are disposed on the same circuit chip 3. The circuit chip 3 is disposed in a package, a case, a container or the like, in which both of the chips 1, 2 are disposed on the circuit chip 3.

Each detection unit 110, 210 has a beam structure. The beam structure provides the movable electrodes 111, 112, 211, 212 and the fixed electrodes 113, 114, 213, 214. The movable electrodes 111, 112, 211, 212 and the fixed electrodes 113, 114, 213, 214 are disposed so as to face to each other, and provide differential capacitances. The signals P1a, P2a, P1b, P2b including voltages Vdd, phases of which are inverted to each other, are applied to the fixed electrode 113, 114, 213, 214 periodically, and thereby, the acceleration can be measured based on the differential capacitance change. The differential capacitance change corresponds to displacements of the movable electrodes 111, 112, 211, 212.

The detection circuits 120, 220 include C-V conversion circuits 130, 230, switch circuits 140, 240, signal processing circuits 150, 250 and a control signal generation circuit 160. The C-V conversion circuits 130, 230 include operational amplifiers 131, 231, capacitors 132, 232 and switches 133, 233. The differential capacitance change between the movable electrodes 111, 112 and the fixed electrodes 113, 114 is converted in to a voltage by the C-V conversion circuits 130, 230. Non-inverting input terminals of the operational amplifiers 131, 231 are connected with the movable electrodes 111, 112, 211, 212. The capacitors 132, 232 and the switches 133, 233 are connected in parallel between the non-inverting input terminals and output terminals. The switches 133, 233 are, respectively, driven by signals S2a, S2b from the control signal generation circuit 160. Predetermined voltages are input into non-inverting terminals of the operational amplifiers 131, 231 via the switch circuits 140, 240.

The switch circuits 140, 240 can cause voltages from voltage sources (which are not shown) to input into the non-inverting input terminals of the operational amplifiers 131, 231 of the C-V conversion circuits 130, 230. The switch circuits 140, 240 include switches 141, 142 and switches 241, 242. Among the above-described switches, the switches 141, 142 are driven by the signal S1a from the control signal generation unit 160. The switches 141, 142 are configured such that, when one is in an OPEN state, the other is in a CLOSE state. The switches 241, 242 are driven by the signal S1b from the control signal generation unit 160. The switches 241, 242 are configured such that, when one is in the CLOSE state, the other is in the OPEN state. Based on the signals S1a, S1b from the control signal generation unit 160: the switches 141, 241 are switched to the CLOSE state during a period of a normal operation; and the switches 141, 241 are switched to the OPEN state during a period of the self-diagnosis operation. When the switches 141, 241 are in the CLOSE state, a reference voltage for detecting a capacitance change is input into the non-inverting input terminals of the operational amplifiers 131, 231. In the above-described manner, the two acceleration sensors 100, 200 have an identical reference voltage V1 during the period of the normal operation (i.e., during a period when the acceleration is being detected normally). In the present embodiment, the reference voltage V1 is approximately half of the voltage Vdd, corresponding to the voltage Vdd/2 to be applied to the fixed electrodes 113, 114, 213, 214 (i.e., midpoint voltage Vdd/2 is applied to the fixed electrodes 113, 114, 213, 214). Based on the signals S1a, S1b from the control signal production unit 160, the switches 142, 242 are in the CLOSE state during the period of the self-diagnosis operation, and the switches 142, 242 are in the CLOSE state during the period of the normal operation. When the switches 142, 242 are in the CLOSE state, the voltages V2, V3 for the self-diagnosis operation are input into the non-inverting input terminals of the operational amplifiers 131, 231. The voltages V2, V3 for the self-diagnosis operation are different from the reference voltage V1. In the present embodiment: the voltage V2 for the self-diagnosis operation of the acceleration sensor 100 is given as V1+VX; and the voltage V3 for the self-diagnosis operation of the acceleration sensor 200 is given as V1−VX. In the present embodiment, the acceleration sensor 100 is substantially identical to the acceleration sensor 200 in an aspect of a configuration except the voltage for the self-diagnosis operation; the voltage V2 for the self-diagnosis operation of the acceleration sensor 100 is different from the voltage V3 for the self-diagnosis operation of the acceleration sensor 200.

Signal processing circuits 150, 250 include low-pass filter (LPF) circuits 151, 251 and GAIN circuits 152, 252. The LPF circuits 151, 251 can remove high-frequency components from output signals of the C-V conversion circuits 130, 230. The LPF circuits 151, 251 can extract signal components within a predetermined frequency range. The LPF circuits 151, 251 include sample-hold circuits, by which output voltages of the C-V conversion circuits 130, 230 can be sampled and held. The GAIN circuits 152, 252 can amplify signals from the LPF circuits 151, 251, and output the amplified signals which correspond to acceleration signals OUT1, OUT2.

The control signal generation circuit 160 outputs signals (carrier) P1a, P2a, P1b, P2b, signals S1a, S1b, and signals S2a, S2b. The signals P1a, P2a, P1b, P2b indicate a time when voltages are applied to the fixed electrodes 113, 114, 213, 214. The signals S1a, S1b indicate a time when the switch circuits 140, 240 switch. The signals S2a, 52b indicate a time when the switch circuits 133, 233 switch. Various signals generated in the control signal generation circuit 160 vary between the normal operation and the self-diagnosis operation. More specifically, the control signal generation circuit 160 outputs signals for the normal operation when a self-diagnosis command signal is in a low level state, and the control signal generation circuit 160 outputs signals for the self-diagnosis operation when the self-diagnosis command signal is in a high level state. The control signal generation circuit 160 outputs the various signals based on a clock signal CLK. The two acceleration sensors 100, 200 are configured to be capable of measuring acceleration simultaneously, and performing the self-diagnosis operations simultaneously.

Operations of the above-described capacitive physical quantity detection device and the acceleration sensors 100, 200 are described below, in which operations performed during the period of the normal operation and operations performed during the period of the self-diagnosis operation may be distinguished.

Figure 3:
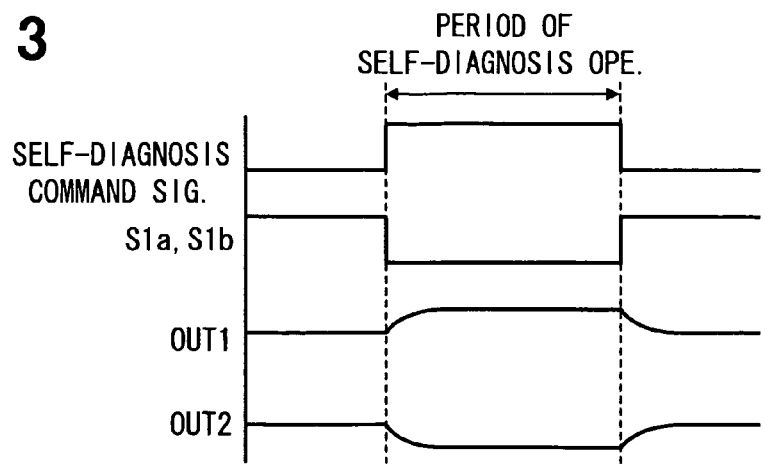
FIG. 3 is a graph showing a sensor output during a period of a self-diagnosis operation.

During the period of the normal operation, the signals S1a, S1b are in the high level state, as shown in FIG. 3. Based on the signals S1a, S1b; the switches 142, 242 are switched to an OFF state; and the switches 141, 241 switch to an ON state. The reference voltage V1, corresponding to Vdd/2, is applied to each of the non-inverting terminals of the operational amplifiers 131, 231, and the movable electrodes 111, 112, 211, 212 have the reference voltage V1, corresponding to Vdd/2.

Voltage levels of the signals P1a, P2a are inverted to voltage levels of the signals P1b, P2b. Each signals P1a, P2, P1b, P2b has an amplitude corresponding to Vdd. The signals P1a, P2, P1b, P2b include rectangular waves, levels of which are changeable between the high level and the low level. Each rectangular wave has the predetermined amplitude.

In a first period t1, based on the signals P1a, P2a and the signals P1b, P2b, electric potentials of the fixed electrodes 113, 213 become Vdd, and electric potentials of the fixed electrodes 114, 214 become 0V. In addition, the signals S2a, S2b from the control signal generation circuit 160 cause the switches 133, 233 to be in the CLOSE state. Therefore, electric potentials of the movable electrodes 111, 112, 211, 212 are biased to be V1 due to a function of the operational amplifiers 131, 231. Electric charges stored in the capacitors 132, 232, each of which has feedback capacity, are released. In the above-described case, when capacitances C1 between the movable electrodes 111, 211 and the fixed electrodes 113, 213 are larger than capacitances C2 between the movable electrodes 112, 212 and the fixed electrodes 114, 214 (when a relation of C1>C2 is satisfied), the movable electrodes 111, 112, 211, 212 are in a strongly-negative-charged state in accordance with the relation of C1>C2 and the relation of the electric potentials applied to the fixed electrodes 113, 114, 213, 214.

In a second period t2, based on the signals P1a, P2a and the signals P1b, P2b, the electric potentials of the fixed electrode 113, 213 remain to be Vdd, and the electric potentials of the fixed electrodes 114, 214 remain to be 0V. The signals S2a, S2b from the control signal generation circuit 160 cause the switches 133, 233 to be in the OPEN state. Therefore, the capacitors 132, 232 store electric charges, the amounts of which are associated with states of the movable electrodes 111, 112, 211, 212. In the above described case, when voltages are output from the C-V conversion circuits 130, 230, the output voltages of the C-V conversion circuits 130, 230 are input into the LPF circuits 151, 251. Output voltage values of the C-V conversion circuits 130, 230 are associated with the electric charges stored in the capacitor 132, 232. The output voltages are sampled and held by sampling circuits included in the LPF circuits 151, 251.

In a third period t3, based on the signals P1a, P2a, the electric potentials of the fixed electrodes 113, 213 become 0V, and based on the signals P1b, P2b, the electric potentials of the fixed electrodes 114, 214 become Vdd. In addition, the signals S2a, S2b from the control signal generation circuit 160 cause the switches 133, 233 to remain to be in the OPEN state. In the above-described case, charged states of the movable electrodes 111, 112, 211, 212 are opposite to that in the case of the second period t2 because of inversion of the signal P1a, P2a and the signal P1b, P2b. When the relation of C1>C2 is satisfied, the movable electrodes 111, 112, 211, 212 are in a strongly-positive-charged state because of inversion of the electric potentials applied to the fixed electrodes 113, 114, 213, 214.

In the above-described case, the movable electrodes 111, 112, 211, 212 and the capacitors 132, 232 are in a closed circuit state. Since electric charges in the first period t1 are conserved, the electric charged released from the movable electrodes 111, 112, 211, 212 are transferred to and stored in the capacitor 132, 232. Since electric charges Q stored in a capacitor is proportional to its capacitance C and its voltage V (i.e., Q=CV), the voltages from the C-V conversion circuits 130, 230 are proportional to the amounts of the transferred electric charges, and are inversely proportional to capacitances C of the capacitors 132, 232.

In a fourth period t4, based on the signals P1a, P2a and the signals P1b, P2b, the voltages of the fixed electrodes 113, 213 become 0V, and the voltages of the fixed electrodes 114, 214 become Vdd. After that, when outputs of the C-V conversion circuits 130, 230 are substantially stable, the output voltages of the C-V conversion circuits 130, 230 are input into the LPF circuits 151, 251, and are sampled.

The sample-hold circuits perform differential calculations between the voltages sampled in the period t2 and the voltages sampled in the period t4. The calculated values or signals are amplified in the GAIN circuits 152, 252, and the acceleration signals OUT 1, OUT 2 are output. Therefore, because of canceling out, the outputs do not substantially include the following components: a component associated with 1/f noise; a component associated with offset voltages of operational amplifiers; a component associated with temperature characteristics of the operational amplifiers; and a component associated with temperature characteristic of switching noise of Tr generated when the sampling is performed in the sample-hold circuits. Based on the above-described outputs, the accelerations can be detected in accordance with displacements of the movable electrodes 111, 112, 211, 212.

During the period of the self-diagnosis operations, the signals P1a, P2a, P1b, P2b are applied to the fixed electrodes 113, 114, 213, 214, similarly to a case where the normal operation is performed. Also, the signal S1a, S1b are in the high level state, as shown in FIG. 3. The switches 142, 242 switch to the ON state, and the switches 141, 241 switch to the OFF state, and thereby, the self-diagnosis voltages V2, V3 are input into the non-inverting input terminals of the operational amplifiers 131, 231, respectively. Each self-diagnosis voltage V2, V3 is different from the reference voltage V1. The movable electrodes 111, 112 have the self-diagnosis voltage V2. The movable electrodes 211, 212 have the self-diagnosis voltage V3.

As described above, the voltages V2, V3 for the self-diagnosis operations are input into the non-inverting input terminals of the operational amplifiers 131, 231, respectively. Therefore, electric potential differences between the movable electrodes 112, 212 and the fixed electrodes 114, 214 are higher than electric potential differences between the movable electrodes 111, 211 and the fixed electrodes 113, 213. Because of increase of electrostatic forces, the electrostatic forces forcibly move the movable electrodes 111, 112, 211, 212 from center points.

After that, based on the signals S1a, S1b, the switch circuits 140, 240 switch the switches. The reference voltage V1, corresponding to the midpoint voltage Vdd/2, is applied to the non-inverting input terminals of the operational amplifiers 131, 231, similarly to the case where the normal operation is performed.

After that, operations similar to the above-described operations performed during the period of the normal operation are performed, and the acceleration signals OUT 1, OUT 2 are provided. Components of the acceleration signals OUT 1, OUT 2 are associated with displacements of the movable electrodes 111, 112, 211, 212. In the above-described case: the amounts of the displacements can be uniquely determined from the voltages applied to the non-inverting terminals of the operational amplifiers 131, 231; and the outputs associated with the displacement amounts of the movable electrodes 111, 112, 211, 212 are also uniquely determined. The self-diagnosis operations are performed by comparing the determined outputs and self-diagnosis values (i.e., self-diagnosis outputs).

In the present embodiment, as described above, the self-diagnosis voltages for the acceleration sensors 100 and 200 are set to be V2 (=V1+VX) and V3 (=V1−VX), respectively. Therefore, the output OUT 1 from the acceleration sensor 100 is given as V2+α, where α is an increment factor corresponding to a gain value. Also, the output OUT 2 from the acceleration sensor 200 is given as V3+β, where β is an increment factor corresponding to a gain value. As shown in FIG. 3, the output voltage (i.e., the self-diagnosis output) of the acceleration sensor 100 is different from that of the acceleration sensor 200. Therefore, even if the acceleration sensor 100 and the acceleration sensor 200 do short therebetween, a voltage caused by the short is different from the output voltages from the acceleration sensors 100, 200, and thus, an occurrence of an abnormal short can be recognized and determined.

Figure 4:
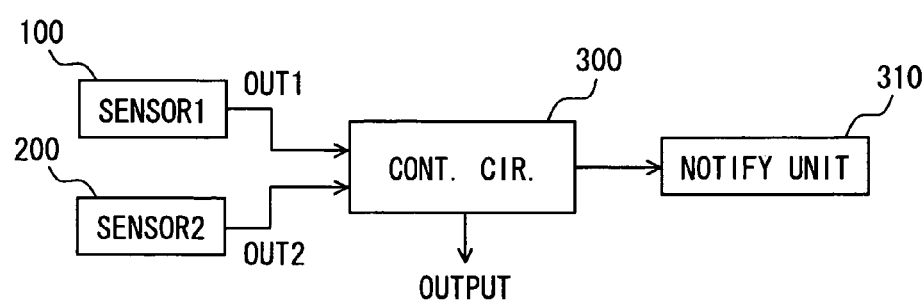
FIG. 4 is a schematic diagram illustrating a system including the capacitive physical quantity detection device, the system detecting and notifying an abnormal short.

Various ways can allow the occurrence of an abnormal short to be detected. In the present embodiment, the outputs OUT 1, OUT 2 of the acceleration sensors 100, 200 are input into a control circuit 300, as shown in FIG. 4. Functions of the control circuit 300 include arithmetic computation and comparison determination. During the period of the self-diagnosis operations, the control circuit 300 can compare between the self-diagnosis outputs and the outputs OUT 1, OUT 2 of the acceleration sensors 100, 200, respectively. When the outputs OUT 1, OUT 2 are, respectively, consistent with the self-diagnosis outputs, the control circuit 300 determines that the capacitive physical quantity detection device is in a normal state. When the outputs OUT 1, OUT 2 are inconsistent with the self-diagnosis outputs, the control circuit 300 determines that the capacitive physical quantity detection device is in an abnormal state. When the abnormal short occurs, a voltage value of the output OUT 1 becomes substantially equal to that of the output OUT 2, and therefore, by the above-described method, the occurrence of the abnormal short can be determined.

When the control circuit 300 determines that the capacitive physical quantity detection device is in the normal state, the acceleration sensors 100, 200 output the outputs OUT 1, OUT 2 to, for example, a control circuit of the VSC during the normal operation is performed. When the control circuit 300 determines that the capacitive physical quantity detection device is in the abnormal state due to the abnormal short or the like: a signal for notifying the abnormal state is output to a notifying unit 310; and the outputs OUT 1, OUT 2 may not be output to, for example, the control circuit of the VSC during the period of the normal operation. The notifying unit 310 includes, for example, a screen of a navigation system, a display member of an instrument panel or the like.

In the present embodiment, the control circuit 300 as an electronic control unit is provided separately from the capacitive physical quantity detection device. Alternatively, the control circuit 300 may be incorporated in the capacitive physical quantity detection device.

In the present embodiment, the self-diagnosis voltage in each sensor 100, 200 is applied to the non-inverting input terminal of the differential amplifier circuit, and the applied self-diagnosis voltage affects the amount of displacement of the movable electrode during the period of the self-diagnosis operation as well as an output from sensor corresponding to the self-diagnosis output. The self-diagnosis voltages for the two acceleration sensors 100, 200 are different from each other. Therefore, the output voltages from the acceleration sensors 100, 200 are different from each other during the period of the self-diagnosis operations. Further, the occurrence of an abnormal short can be detected based on the self-diagnosis outputs even though the one reference voltage V1 is used in both of the acceleration sensors 100 and 200, and even though the self-diagnosis operation in each sensor 100, 200 is performed simultaneously.

In the present embodiment, a voltage difference VX between the reference voltage V1 and the self-diagnosis voltage (V1+VX) for the acceleration sensor 100 is almost equal to a voltage difference VX between the reference voltage V1 and the self-diagnosis voltage (V1−VX) for the acceleration sensor 200. Therefore, it is possible to provide the control circuit 300 having a simplified configuration since the self-diagnosis outputs are symmetric with respect with normal operation outputs provided during the period of the normal operation when an inertia force resulting from acceleration is not applied. However, the self-diagnosis voltages V2, V3 may be set to be different from the above-described examples. As long as the self-diagnosis voltages V2, V3 are set to be different from the reference voltage V1, and as long as the voltages V2, V3 are different from each other, both of the self-diagnosis voltages V2, V3 can be set to be, for example, larger or smaller than the reference voltage V1 in an alternative configuration.

In the present embodiment, an occurrence of the abnormal short can be detected by comparing the self-diagnosis outputs to the corresponding outputs OUT 1, OUT 2 which are provided during the self-diagnosis operation is performed. Alternatively, by comparing the output 1 with the output 2, and by determining whether the output OUT 1 is consistent with the output OUT 2 or not, an occurrence of the abnormal short may be detected. In the present embodiment, the self-diagnosis voltage V2 for the acceleration sensors 100 is larger than the reference voltage V1 while the voltage V3 for the self-diagnosis operation of the acceleration sensors 200 is smaller than the reference voltage V1. For the above-described reason: the self-diagnosis outputs are in anti-phase; and the output OUT 1 and the output OUT 2 rise and fall during the period of the normal operation, respectively, when an inertia force caused by acceleration is not applied. An alternative configuration may be described as follows: the control unit 300 may be configured to perform differential processing of the outputs OUT 1, OUT 2, and the control unit 300 can determine an occurrence of the abnormal short in a short time based on polarities of the differential processing results.

Second Embodiment

Figure 5:
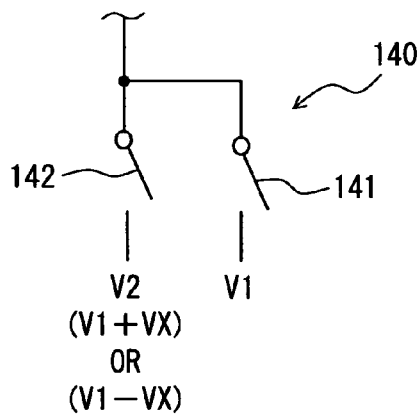
FIG. 5 is a schematic diagram of a switch circuit of an acceleration sensor of a capacitive physical quantity detection device according to a second embodiment of the present invention.
Figure 6:
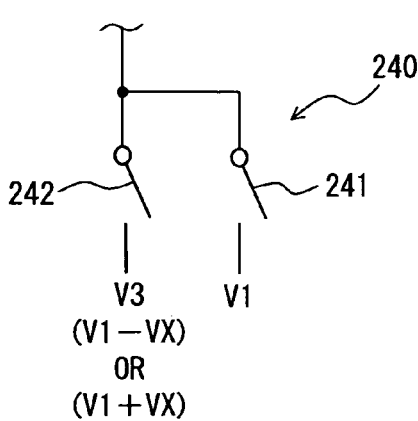
FIG. 6 is a schematic diagram of a switch circuit of another acceleration sensor of the capacitive physical quantity detection device according to the second embodiment of the present invention.

A capacitive physical quantity detection device according to a second embodiment is described below with reference to FIGS. 5-7.

In the first embodiment, the self-diagnosis voltage is set for each acceleration sensor 100, 200. However, if the self-diagnosis operation is performed at a time when the vehicle is on a sloped plane, the displacements of the movable electrodes 111, 112, 211, 212 are further influenced by the gravitational force. There is a possibility that the outputs OUT 1, OUT 2 from the acceleration sensors 100, 200 have an almost equal electric potential in some cases depending on influence degree of the gravitational force. As described above, when a perturbation force such as the gravitational force influences the displacements of the movable electrodes 111, 112, 211, 212, there is a possibility that an electric potential of the OUT 1 from the acceleration sensors 100 is substantially equal to an electric potential of the OUT 2 from the acceleration sensors 200 in some cases even if the self-diagnosis voltage in the one capacitive physical quantity sensor is different from the self-diagnosis voltage in the other capacitive physical quantity sensor.

In view of the above-description, in the present embodiment, the two different voltages are input into the non-inverting input terminals of the operational amplifiers 131, 231 of the C-V conversion circuits 130, 230 at different times during the period of the self-diagnosis operations. In other words, a plurality of combinations between waveform patterns of the outputs OUT 1, OUT 2 is provided, the outputs OUT 1, OUT 2 being output during the period of the self-diagnosis operations. An example is shown in FIG. 5. At a power source side, the switch circuit 140 of the acceleration sensor 100 switches the voltage V2 for the self-diagnosis operation of the acceleration sensor 100 at a certain time, where the voltage V2 is input via the switch, and where the certain time is associated with the self-diagnosis operation. In the present embodiment, the voltage V2 is switched between V1+VX and V1−VX alternately. As shown in FIG. 6, at a power source side, the switch circuit 240 of the acceleration sensor 200 switches the voltage V3 for the self-diagnosis operation of the acceleration sensor 200 at a certain time, where the certain time is associated with the self-diagnosis operation, and where the voltage V3 is input via the switch 242. In the present embodiment, the voltage V3 is switched between V1−VX and V1+VX, alternately. The voltages V2, V3 are switched simultaneously so that: when the voltage V2 for the self-diagnosis operation is given as V1+VX, the voltage V3 for the self-diagnosis operation is given as V1−VX; and when the voltage V2 for the self-diagnosis operation is given as V1−VX, the voltage V3 for the self-diagnosis operation is given as V1+VX.

Figure 7:
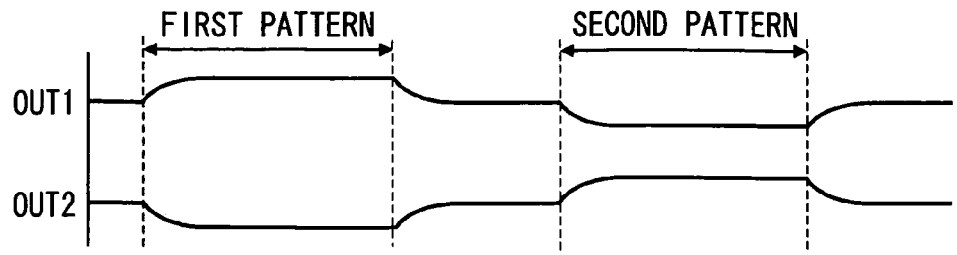
FIG. 7 is graph showing a sensor output during a period of a self-diagnosis operation.

As a result of the above-described manner, as shown in FIG. 7, during the period of the self-diagnosis operation, each of the outputs OUT 1, OUT 2 shows two patterns: according to one pattern, the voltage V2 and the voltage V3 can be expressed as V1+VX and V1−VX, respectively; and according to the other pattern, the voltage V2 and the voltage V3 can be expressed as V1−VX and V1+VX, respectively. When the gravitational force does influence the OUT 1 and the OUT 2, a voltage difference between the OUT 1 and the OUT 2 according to the one pattern is different from a voltage difference between the OUT 1 and the OUT 2 according to the other pattern. When the electric potential of the OUT 1 is substantially equal to the electric potential of the OUT 2 according the one pattern due to the influence of the gravitational force, the electric potential of the OUT 1 is not substantially equal to the electric potential of the OUT 2 according the other pattern In the present embodiment, the combining of the outputs OUT 1, OUT 2 for the self-diagnosis operations of the acceleration sensors 100, 200 provides at least two patterns, as described above. An occurrence of the abnormal short is detected when both of or more than the two patterns of the output OUT 1, OUT 2 are identical to each other. When at least one pattern among the patterns of the output OUT 1, OUT 2 is different, it is determined that the abnormal short does not occur. Therefore, it is possible to determines an occurrence of the abnormal short when the capacitive physical quantity detection device is mounted to the vehicle on an inclined plane. In the present embodiment, the control circuit 300 can compare the output OUT 1 and the OUT 2, and determine an occurrence of the abnormal short, as described in the capacitive physical quantity detection device according to the first embodiment.

In the present embodiment, a high voltage expressed as V1+VX and a low voltage expressed as V1−VX are input to each of the non-inverting input terminals of the operational amplifiers 131, 231. Regarding each of the acceleration sensors 100, 200, the difference between the voltages for self-diagnosis operations is large, and therefore, it is possible to perform high precision determination of an occurrence of the abnormal short. A plurality of voltages V2 for the self-diagnosis operations and a plurality of voltages V3 for the self-diagnosis operations may be provided differently. As long as the plurality of voltages for the self-diagnosis operations is different from the reference voltage V1, and different from each other, all of the plurality of voltages for the self-diagnosis operations may be set to be, for example, larger or smaller than the reference voltage V1 in an alternative configuration.

In the present embodiment, as shown in FIG. 7, a time gap is configured to exist between a first pattern and a second pattern when the voltages V2, V3 for the self-diagnosis operation is switched. However, a timing of the switching of the voltages V2, V3 for the self-diagnosis operations may be different from the above described example. As long as at least two patterns are output during a predetermined period of the self-diagnosis operations, the voltages V2, V3 for the self-diagnosis operations may be, for example, continuously switched in an alternative configuration.

Figure 8:
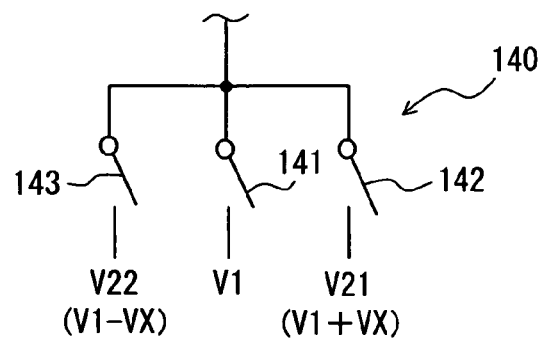
FIG. 8 is a circuit diagram showing a switch circuit according to a modification embodiment of the present invention.
Figure 9:
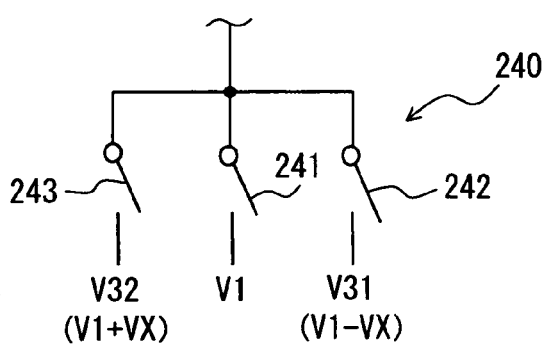
FIG. 9 is a circuit diagram showing another switch circuit according to the modification embodiment of the present invention.

In the present embodiment, as described above, each of the voltages V2, V3 for the self-diagnosis operations is switched at the power source side while relating the self-diagnosis operations. Alternatively, for example as shown in FIGS. 8, 9, a voltage source and corresponding switches 141-143, 241-243 may be further included. According to a configuration shown in FIG. 8, the switch circuit 140 includes the switch 141 for the reference voltage V1, the switch 142 for a voltage V21 expressed also as V1+VX for the self-diagnosis operation, the switch 143 for a voltage V22 expressed also as V1−VX. The voltage V21 is different from the voltage V22. According to FIG. 9, the switch circuit 240 includes the switch 241 for the reference voltage V1, the switch 242 for a voltage V31 expressed also as V1−VX for the self-diagnosis operation, the switch 243 for a voltage V32 expressed also as V1+VX. The voltage V31 is different from the voltage V32. During the period of the self-diagnosis operation, the following two states are provided by switching the states: one state is that the switches 142, 242 are in the CLOSE state, and the switches 143, 243 are in the OPEN state; and the other state is that the switches 143, 243 are in the CLOSE state, and the switches 142, 242 are in the OPEN state.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

In the embodiments described above, the acceleration sensors are described as an example of the capacitive physical quantity sensor. However, the capacitive physical quantity sensor may be, for example, a pressure sensor, a angular velocity sensor, a yaw rate sensor and the like In the above-described embodiments, the two acceleration sensors 100, 200 are described as an example of a plurality of capacitive physical quantity sensors, wherein the acceleration sensors 100, 200 have the movable electrodes disposed so that displacement directions of the movable electrodes are mutually orthogonal. However, the number of sensors may be different from the above-described example. The capacitive physical quantity detection device may include greater than or equal to three sensors, and therefore, arbitrary two sensors for detecting the abnormal short among the sensors may be included in the above device. Moreover, arrangement of two acceleration sensors may be different from the case of the above-described embodiments. For example, two acceleration sensors may be configured so as to detect an acceleration component, for example, along the same axis direction.

In the above-described embodiments, the accelerations sensors 100, 200 are disposed on the chips 1, 2 separately form each other. Alternatively, at least the detection units 110, 210 may be integrated on one chip.

What is claimed is:

1. A capacitive physical quantity detection device for detecting a physical quantity, comprising:
    a plurality of capacitive physical quantity sensors, wherein each capacitive physical quantity sensor performs a self-diagnosis operation and a normal operation, each capacitive physical quantity sensor including:
    a detection unit having a movable electrode movable in accordance with the physical quantity and a fixed electrode facing the movable electrode;
    a C-V conversion circuit having a differential amplifier circuit, wherein a first negative or inverting input terminal of the differential amplifier circuit is coupled with the movable electrode,
    a second positive or non-inverting input terminal of the differential amplifier circuit inputs a reference voltage therein during a period of the normal operation and inputs a self-diagnosis voltage therein during a period of the self-diagnosis operation, wherein the reference voltage is used for detecting a capacitance change between the movable electrode and the fixed electrode, and the self-diagnosis voltage is used for performing the self-diagnosis operation, and the self-diagnosis voltage is different from the reference voltage, and the C-V conversion circuit outputs an output voltage corresponding to the capacitance change between the movable electrode and the fixed electrode; and
    a signal processing circuit that performs a signal processing of the output voltage from the C-V conversion circuit so as to produce a signal corresponding to the physical quantity, wherein the reference voltage in each capacitive physical quantity sensor is substantially the same;
    the plurality of capacitive physical quantity sensors perform the self-diagnosis operation simultaneously, the self-diagnosis voltage in one of the plurality of capacitive physical quantity sensors is a first self-diagnosis voltage, the self-diagnosis voltage in another one of the plurality of capacitive physical quantity sensors is a second self-diagnosis voltage, and, the first self-diagnosis voltage is greater than the reference voltage, and the second self-diagnosis voltage is less than the reference voltage,
    a signal that is output from the one of the plurality of capacitive physical quantity sensors is a first signal, a signal that is output from the another one of the plurality of capacitive physical quantity sensors is a second signal, and the capacitive physical quantity detection device further comprises a control circuit that is connected with the plurality of capacitive physical quantity sensors and is configured to compare the first signal and the second signal.

2. The capacitive physical quantity detection device according to claim 1, wherein
    a potential difference between the reference voltage and the first self diagnosis voltage is substantially equal to a potential difference between the reference voltage and the second self-diagnosis voltage.

3. The capacitive physical quantity detection device according to claim 1, wherein
    the detection unit in the one of the plurality of capacitive physical quantity sensors is disposed on a first semiconductor substrate,
    the detection unit in the another of the plurality of capacitive physical quantity sensors is disposed on a second semiconductor substrate, and
    the first semiconductor substrate is separate from the second semiconductor substrate.

4. The capacitive physical quantity detection device according to claim 1, wherein
    the detection unit in the one of the plurality of capacitive physical quantity sensors is disposed on a semiconductor substrate, and
    the detection unit in the another one of the plurality of capacitive physical quantity sensors is also disposed on the semiconductor substrate.

5. The capacitive physical quantity detection device according to claim 1, wherein
    a displacement direction of the movable electrode in the one of the plurality of capacitive physical quantity sensors is defined as a first direction,
    a displacement direction of the movable electrode in the another one of the plurality of capacitive physical quantity sensors is defined as a second direction, and
    the one of the plurality of capacitive physical quantity sensors and the another one of the plurality of capacitive physical quantity sensors are disposed such that the first direction is substantially perpendicular to the second direction.

6. The capacitive physical quantity detection device according to claim 1, wherein the capacitive physical quantity detection device is mounted to a vehicle.

7. The capacitive physical quantity detection device according to claim 1, wherein
the self-diagnosis operation provides a detection of an occurrence of a short.

8. A capacitive physical quantity detection device comprising:
a plurality of capacitive physical quantity sensors, wherein each capacitive physical quantity sensor performs a self-diagnosis operation and a normal operation, each capacitive physical quantity sensor including:
a detection unit having a movable electrode movable in accordance with the physical quantity and a fixed electrode facing the movable electrode;
a C-V conversion circuit having a differential amplifier circuit, wherein
a first input terminal of the differential amplifier circuit is coupled with the movable electrode,
a second input terminal of the differential amplifier circuit inputs a reference voltage therein during a period of the normal operation and inputs a self-diagnosis voltage therein during a period of the self-diagnosis operation,
the reference voltage is used for detecting a capacitance change between the movable electrode and the fixed electrode,
the self-diagnosis voltage is used for performing the self-diagnosis operation,
the self-diagnosis voltage is different from the reference voltage, and
the C-V conversion circuit outputs an output voltage corresponding to the capacitance change between the movable electrode and the fixed electrode; and
a signal processing circuit that performs a signal processing of the output voltage from the C-V conversion circuit so as to produce a signal corresponding to the physical quantity, wherein
the reference voltage in each capacitive physical quantity sensor is substantially the same,
the plurality of capacitive physical quantity sensors perform the self-diagnosis operation simultaneously,
the self-diagnosis voltage in one of the plurality of capacitive physical quantity sensors is a first self-diagnosis voltage,
the self-diagnosis voltage in another one of the plurality of capacitive physical quantity sensors is a second self-diagnosis voltage,
the first self-diagnosis voltage is different in magnitude from the second self-diagnosis voltage,
the first self-diagnosis voltage includes a first self-diagnosis potential and a second self-diagnosis potential,
the one of the plurality of capacitive physical quantity sensors switches between the first self-diagnosis potential and the second self-diagnosis potential at a first timing,
the second self-diagnosis voltage includes a third self-diagnosis potential and a fourth self-diagnosis potential,
the another one of the plurality of capacitive physical quantity sensors switches between the third self-diagnosis potential and the fourth self-diagnosis potential at a second timing, and
the first timing is different from the second timing.

9. The capacitive physical quantity detection device according to claim 8, wherein
the first potential is higher than the reference voltage,
the second potential is lower than the reference voltage,
the third potential is higher than the reference voltage, and
the fourth potential is lower than the reference voltage.

10. A capacitive physical quantity detection device for detecting a physical quantity, comprising:
a plurality of capacitive physical quantity sensors, wherein each capacitive physical quantity sensor performs a self-diagnosis operation and a normal operation, each capacitive physical quantity sensor including:
a detection unit having a movable electrode movable in accordance with the physical quantity and a fixed electrode facing the movable electrode; a C-V conversion circuit having a differential amplifier circuit, wherein a first negative input terminal of the differential amplifier circuit is coupled with the movable electrode, a second positive input terminal of the differential amplifier circuit inputs a reference voltage therein during a period of the normal operation and inputs a self-diagnosis voltage therein during a period of the self-diagnosis operation, wherein the reference voltage is used for detecting a capacitance change between the movable electrode and the fixed electrode, and the self-diagnosis voltage is used for performing the self-diagnosis operation, and the self-diagnosis voltage is different from the reference voltage, and the C-V conversion circuit outputs an output voltage corresponding to the capacitance change between the movable electrode and the fixed electrode; and a signal processing circuit that performs a signal processing of the output voltage from the C-V conversion circuit so as to produce a signal corresponding to the physical quantity, wherein the reference voltage in each capacitive physical quantity sensor is substantially the same, the plurality of capacitive physical quantity sensors perform the self-diagnosis operation simultaneously, the self-diagnosis voltage in one of the plurality of capacitive physical quantity sensors is a first self-diagnosis voltage, the self-diagnosis voltage in another one of the plurality of capacitive physical quantity sensors is a second self-diagnosis voltage, and the first self-diagnosis voltage is greater than the reference voltage, and the second self-diagnosis voltage is less than the reference voltage;
a signal that is output from the one of the plurality of capacitive physical quantity sensors is a first signal, a signal that is output from the another one of the plurality of capacitive physical quantity sensors is a second signal, and
the capacitive physical quantity detection device further comprises a control circuit that detects an occurrence of a short between the one of the plurality of capacitive physical quantity sensors and the another one of the plurality of capacitive physical quantity sensors, based on the first and the second signal.

* * * * *